United States Patent [19]
Ford et al.

[11] Patent Number: 4,623,463
[45] Date of Patent: Nov. 18, 1986

[54] FORMATION OF POROUS MEMBRANES

[75] Inventors: Douglas L. Ford, Eastwood, Australia; Clinton V. Kopp, Barrington, Ill.; Eric W. Anderson, Neutral Bay, Australia

[73] Assignee: Memtec Limited, Parramatta, Australia

[21] Appl. No.: 692,892

[22] PCT Filed: May 9, 1984

[86] PCT No.: PCT/AU84/00081
§ 371 Date: Jan. 9, 1985
§ 102(e) Date: Jan. 9, 1985

[87] PCT Pub. No.: WO84/04529
PCT Pub. Date: Nov. 22, 1984

[30] Foreign Application Priority Data

May 9, 1983 [AU] Australia .............................. 14358/83

[51] Int. Cl.$^4$ ............................................. B29C 39/02
[52] U.S. Cl. ................................. 210/500.29; 264/41; 264/49; 210/500.38; 210/500.39
[58] Field of Search .................. 264/41, 49; 210/500.2

[56] References Cited

U.S. PATENT DOCUMENTS

| 3,711,583 | 1/1973 | Sklor | 264/49 |
| 3,760,054 | 9/1973 | Moulds | 264/49 |
| 3,862,030 | 1/1975 | Goldberg | 264/41 |
| 3,969,562 | 7/1976 | Suzuki | 428/155 |
| 3,985,840 | 10/1976 | Hofacker | 264/41 |
| 4,046,843 | 9/1977 | Sano et al. | 264/22 |
| 4,100,238 | 7/1978 | Shinomura | 264/49 |
| 4,197,148 | 4/1980 | Shinomura | 156/79 |
| 4,257,997 | 3/1981 | Soehngen et al. | 264/145 |
| 4,307,135 | 12/1981 | Fox | 264/49 |
| 4,416,839 | 11/1983 | Inata et al. | 264/49 |
| 4,419,308 | 12/1983 | Matsumura et al. | 264/49 |

FOREIGN PATENT DOCUMENTS

| 0505494 | 10/1979 | Australia . |
| 55-106243 | 8/1980 | Japan . |
| 57-98531 | 6/1982 | Japan . |
| 1353246 | 5/1974 | United Kingdom . |
| 2115344 | 9/1983 | United Kingdom . |
| 2116107 | 9/1983 | United Kingdom . |

Primary Examiner—Donald Czaja
Assistant Examiner—Leo B. Tentoni
Attorney, Agent, or Firm—Oblon, Fisher, Spivak, McClelland & Maier

[57] ABSTRACT

This invention relates to a method of forming porous membranes from thermoplastic or polymeric materials and to membranes so formed.

17 Claims, No Drawings

FORMATION OF POROUS MEMBRANES

BACKGROUND OF THE INVENTION

1. Field of the Invention

Synthetic polymeric membranes are used for separation of species by dialysis, electrodialysis, ultrafiltration, cross flow filtration, reverse osmosis and other similar techniques.

2. Description of the Prior Art

Prior art methods for forming synthetic polymeric membranes are discussed in Australian patent specification No. 505,494 of Unisearch Limited.

One such method which was developed by S. Loeb and S. Sourirajan at the University of California, Los Angeles concerned the formation of a membrane from a solution of a polymer (such as cellulose acetate) in a solvent (such as acetone media). A thin layer of the solution was spread onto a glass plate and the solvent allowed to evaporate. As the surface layer dried faster than the layer underneath, a skin surface layer was formed and beneath that was a semi-solid matrix. The membrane was then quenched in another solvent whereby the remaining polymer was precipitated to form a sponge-like backing of the membrane.

The membrane forming technique disclosed in Unisearch Australian patent specification No. 505,494 is broadly described as being the controlled unidirectional coagulation of the polymeric material from a solution which is coated onto a suitable inert surface. The first step in the process is the preparation of a "dope" by dissolution of a polymer. This is said to be achieved by cutting the hydrogen bonds (which link the molecular chains of the polymer together) with a solvent. After a period of maturation, the dope is then cast onto a glass plate and coagulated by immediate immersion in a coagulation bath which is capable of diluting the solvent and annealing the depolymerization compound which has been used. According to the one example given in the specification, the "dope" consisted of a polyamide dissolved in a solvent which comprised hydrochloric acid and ethanol.

In contradistinction to the polymeric solution teachings of Australian patent specification No. 505,494 and its discussion on the prior art, the present invention is based on the concept that the liquid material out of which the membrane is cast is a colloidal suspension so that the surface pore density is significantly increased over the surface pore density of prior membranes.

DISCLOSURE OF THE INVENTION

According to the present invention, a single, chemically homologous, hydrolysable thermoplastic material having both relatively non-crystalline and relatively crystalline portions is dissolved in a suitable solvent under conditions which cause the relatively non-crystalline portions of the thermoplastic material to dissolve while at least a portion of the relatively crystalline portion does not dissolve but forms a colloidal dispersion in the solvent. The colloidal dispersion and solvent may be then coated onto a surface as a film and thereafter precipitation of the dissolved thermoplastic portion in the film is effected to form a porous membrane.

In the porous membrane so formed, the colloidal relatively crystalline portions of the thermoplastic material are joined together by the precipitated relatively non-crystalline portions, with pores in the membrane being defined by spaces between said relatively crystalline portions. The pore sizes are governed by their proximity to the surface which the film is coated and thus form a graduation of sizes.

The single, chemically homologous, hydrolysable thermoplastic starting material may be selected from any polymeric material having relatively crystalline and relatively non-crystalline portions. The following materials are typical examples of the thermoplastics starting materials which may be used in carrying out the invention:

(a) polyamides such as polyamide 6 or Nylon-6 which is formed from caprolactam, the cyclic amide of 6-aminocaproic acid and polyamide 6,6 or Nylon 6,6 which is formed from hexamethyenediamine and adipic acid.

(b) aromatic polyamides in which either the basic or the acidic aliphatic component of polyamide 6,6 is replaced by an aromatic component (c) aramids (i.e. aromatic polyamides in which both the acid and the base components are wholly aromatic) such as the polymer of p-phenylenediamine and terephthalic acid, (d) polyester such as the polymer of ethyleneglycol-terephthalate.

The solvent is selected having regard to the starting material being used with the effectiveness of the solvent depending on its ability to break the hydrogen bonds which link the molecular chains of the polymer together. In the case of polyamide 6 and polyamide 6,6 it is preferred that the solvent be a solution of a strong mineral acid such as hydrochloric acid. For aromatic polyamides, the preferred solvent is sulphuric acid. Another suitable solvent is nitric acid. The role of the solvent is to hydrolyse the non-crystalline portion rather rapidly and then to attack the crystalline portion. In the case of lower molecular weight polyamides such as nylons, the rate at which the crystalline portion dissolves is comparatively slower than that of the non-crystalline portions.

The solvent may include a co-solvent such as ethanol, methanol, ethyleneglycol or acetic acid to modify the nature of the colloidal dispersion and solvent dope and to vary the physical parameters of the finished membrane. In the case of polyamide 6 or polyamide 6,6, ethanol may be used as a co-solvent to modify the viscosity of the dope and to enhance its castability. The co-solvent may be from 0 to 20% of the volume of the total solvent, varying mainly with the chemical nature of the polymer.

The conditions under which the thermoplastic starting material is dissolved are primarily temperature and time. In general terms, the higher the temperature the less time is required to achieve the desired amount of the relatively crystalline portion in colloidal dispersion in the solvent. The relationship between time and temperature will vary according to the starting material and to the characteristics required of the finished membrane. However, for a particular starting material, too high a temperature causes less selectivity in the dissolution of the crystalline and non-crystalline portions and leads to an inferior membrane than would be the case if the optimum temperature and time relationship was used for that material. The lower or optimum temperature ensures greater selectivity between the crystalline and non-crystalline portions of the material and hence an improved membrane.

The thermoplastic starting material is added to a prepared solvent at an appropriate temperature to ensure that dissolution of the portions of the thermoplastic starting material is not overly rapid or too complete and then follows a maturation period that is appropriate for the starting material and the size of membrane pores required. The longer the maturation period for a given temperature, the more the relatively crystalline portion will dissolve leaving less of the relatively crystalline portion in colloidal suspension and hence providing larger pore size in the finished membrane.

It is preferred that at least 30% of the relatively crystalline portion of the starting material does not dissolve. However, the percentage of the crystalline portion being in colloidal suspension will depend upon the material and upon the parameters required in the membrane. Thus, in some cases the percentage may be as high as 80%. The amount of crystalline portion remaining may be determined from the rate of diffusion as the larger the amount of crystalline portion, the slower will be the diffusion.

The matured solution is coated onto an inert surface such as glass in the form of a film of about 100 microns thick. The thickness of the film may be varied as desired depending upon the thickness and pore structure required in the finished membrane. Polypropylene, polycarbonate and polymethylmethacrylate may also be used as the inert surface.

Precipitation of the dissolved portions (the relatively non-crystalline portion and part of the relatively crystalline portion) of polyamide 6 and 6,6 may be effected by placing the coated glass in a water bath. Caustic soda or ammonia baths may also be used.

If a polyester is used as the starting material, sulphuric acid containing acetic acid and of precisely controlled water content is preferred as the solvent and precipitation may be effected with water or with a solution of ammonium hydroxide of a concentration of up to 15 Normal.

DESCRIPTION OF PREFERRED EMBODIMENTS

The following are examples of the formation of a polymeric membrane in accordance with the present invention:

EXAMPLE 1

A solvent (A) was prepared by mixing 225 ml of 6.67 Normal hydrochloric acid with 15 ml of anhydrous ethanol. 90 grams of 55 dtex 17 filament polyamide 6 (Nylon 6) with zero twist (which constituted the thermoplastic starting material) was added to solvent A (which was at a temperature of 22° C.) over a period of less than 15 minutes.

The mixture ("dope") of the polyamide 6 and solvent A was then left to mature for 24 hours at a temperature of 22° C. during which the relatively non-crystalline portions of the nylon dissolved as did no more than 50% of the relatively crystalline portion of the polyamide 6 with the remaining relatively crystalline portion dispersing in the solvent.

The matured colloidal dispersion and solvent was then spread as a film of about 120 microns thick on a clean glass plate using a flat knife. The coated plate was placed in a water bath where precipitation of the dissolved portions of the polyamide 6 was effected within three minutes. Electron microscopic study of the resultant membrane showed that the colloidal relatively crystalline portions were joined together by the precipitated relatively non-crystalline portions. The pore size increased from the top face to the layer on the glass plate. Water permeability was about 200 liters/square meter/hour under a pressure of 150 Kilo Pascals.

In contrast, amorphous polymer chips of nylon 6 of the same number average molecular weight (22,000) and having no crystallinity were dissolved in solvent (A) in the same way as was the case with the 55 dtex 17 filament polymide 6 and the same procedure followed to give a "membrane" with no measurable permeability under a pressure of 150 Kilo Pascals. This emphasises the importance of highly crystalline, insoluble portions of polymer which are not dissolved in solution but merely finely dispersed.

EXAMPLE 2

A solvent B was prepared by mixing 172.5 ml 10 Normal hydrochloric acid with 52.2 ml water and 15 ml anhydrous ethanol. 97.5 grams nylon 6,6 ("tyre cord") was then placed into the solvent and stirred with a glass rod. The polymer dissolved in less than 15 minutes. The resulting "dope" was matured for one and a half hours (taken from the time of immersion into the solvent) at 22 degrees Celsius. The dope was then placed in an oven at 40 degrees Celsius for half an hour, and cast straight from the oven onto a glass plate at 22 degrees Celsius with a straight edge knife. The membrane was coagulated in a water bath at 20 degrees Celsius, and the coagulated membrane was between 120 and 200 microns in thickness. The water permeability was about 300 liters/square meter/hour under a pressure of 150 Kilo Pascals. This nylon 6,6 membrane was less resistant to oxidation than the nylon 6 membrane.

EXAMPLE 3

An aramid fibre of the polymer of p-phenylenediamine and terephthalic acid was unaffected by the acidic solvent used in Example 1. It was, however, dispersed in 95% sulphuric acid at 60 degrees Celsius in 20 hours. Upon shock cooling on a glass plate and then immersion in water, a thin pellicle of aramid was formed which thickened over 2 hours to form a strong 1 mm thick membrane with a water permeability of 18 liters/square meter/hour at 150 Kilo Pascals.

EXAMPLE 4

A polyester fibre of the polyethyleneterephthalate type was dispersed in 99% sulphuric acid containing 22% acetic acid at 20 degrees Celsius as co-solvent for 0.5 hours. It was then cast as in Example 1 to yield a weaker membrane than is formed from the polyamides. The water permeability was 5760 liters/square meter/hour under a pressure of 150 Kilo Pascals.

EXAMPLE 5

An acid solution was prepared by mixing 4 parts 70% Nitric acid with 1 part glacial acetic acid. A solvent C was prepared by mixing 80 ml acid solution with 1 ml anhydrous ethanol. 57.5 grams 44 dtex 17 filament polyamide 6 was dissolved into the solvent in less than 15 minutes. The dope was matured for 24 hours at 22 degrees Celsius and cast onto a glass plate in the form of a thin sheet. The plate was immersed in a coagulated bath of 0.1% NH$_4$OH solution at 4 degrees Celsius to form a membrane between 200 and 220 micrometres in thickness. The resulting membrane had a distilled water flux of 10 liters/square meter/hour at 100 Kilo Pascals at 22 degrees Celsius.

Although all the above examples refer to the formation of the membrane in the form of a thin sheet, it is to be understood that the membrane may be extruded in fibre form and coagulated in an appropriate bath such as a water bath in accordance with known technology for making hollow fibres. Thus, in this specification the term "film" is to be construed to embrace thin-walled hollow fibres.

EXAMPLE 6

To 90 g. of the dry polyamide 6 yarn used in Example 1 were added 0.9 g. of isophthaloylchloride in 180 ml of cyclohexane and 3 g. of anhydrous potassium carbonate at 22° C. for 36 hours when 93% of the acid chloride had reacted as determined by the fall in UV absorption at 290 nanometres and the content of chloride reactable with boiling ethanolic silver nitrate in the cyclohexane. The cyclohexane was allowed to evaporate, the fibre washed in water for 1 hour, soaked to pH 3 in dilute HCl, washed overnight and dried at 60° C. The isophthaloyl chloride had largely converted some of the amide groups to imide groups with very little —COOH as determined by comparison of methylene blue absorption with the original yarn.

A "dope" was made up according to Example 1. The "dope" was slightly more turbid than that of Example 1 which indicated some greater content of colloidal crystallite or some cross-linking of amorphous polyamide. The "dope" was cast in parallel with the "dope" of Example 1. A comparison of the porous membranes formed showed that the permeabilities to water at 100 kPa for the unmodified polyamide 6 was 117 liter/square meter/hour whereas the imide modified membrane was 97 liter/square meter/hour.

What is claimed and intended to be secured by Letters Patent is:

1. A method of preparing a porous membrane which includes the steps of dissolving a single, chemically homologous, hydrolysable thermoplastic material which has both relatively non-crystalline and relatively crystalline portions into a hydrolytic solvent under conditions of temperature and time which cause the relatively non-crystalline portions of the thermoplastic to dissolve while at least a portion of the relatively crystalline portions of said thermoplastic material do not dissolve, but form a collidal dispersion in said solvent; forming said colloidal dispersion and solvent into a film, and thereafter causing immersion precipitation of the dissolved thermoplastic portions in the said film, to form a porous membrane in which the colloidal, relatively crystalline portions are joined together in the membrane by the precipitated relatively non-crystalline portions, with pores in the membrane being defined by spaces between said relatively crystalline portions.

2. The method of claim 1 wherein the thermoplastic material is a polyamide, a polyimide or a polyester.

3. The method of claim 1 wherein the thermoplastic material is an aromatic polyamide.

4. The method of claim 3 wherein the aromatic polyamide is one in which both acid and base components are wholly aromatic.

5. The method of claim 1 in which said thermoplastic material is polyamide 6 or polyamide 6,6.

6. The method of claim 1 in which said solvent is a solution of strong mineral acid.

7. The method of claim 1 in which said solvent is hydrochloric acid and said thermoplastic material is a polyamide.

8. The method of claim 6 in which said solvent includes from 5 to 20 percent by volume of ethanol as a co-solvent.

9. The method of claim 1 wherein the solvent includes a co-solvent.

10. The method of claim 9 wherein the co-solvent is selected from ethanol, methanol, ethyleneglycol and acetic acid.

11. The method of claim 1 wherein at least 30% of the relatively crystalline portion of the thermoplastic material is not dissolved.

12. The method of claim 1 in which said colloidal dispersion is coated as a film onto an inert surface.

13. The method of claim 12 in which said solvent is a strong mineral acid, and said precipitation step is performed by immersing said coated film into a water bath.

14. The method of claim 12 wherein the film is about 100 microns thick.

15. The method of claim 1 wherein the colloidal dispersion and solvent are extruded in fibre form.

16. The method of claim 1 in which the thermoplastic material is a polyester, the solvent is a mixture of sulphuric and acetic acids and precipitation is effected in an aqueous neutral or basic bath.

17. A porous membrane when manufactured in accordance with the method defined in any one of the preceding claims.

* * * * *